United States Patent [19]

Klebe et al.

[11] 3,789,055

[45] Jan. 29, 1974

[54] ALIPHATICALLY UNSATURATED IMIDES AND METHOD FOR MAKING SAME

[75] Inventors: Johann F. Klebe; Henry A. Wroblewski; Alfred R. Gilbert, all of Schenectady, N.Y.

[73] Assignee: General Electric Company, Schenectady, N.Y.

[22] Filed: Dec. 31, 1970

[21] Appl. No.: 103,303

[52] U.S. Cl.............. 260/51 R, 260/51.5, 260/52, 260/72 R, 260/72 N, 260/78 UA, 260/326.5 FM, 260/874, 260/878, 260/884, 260/886, 117/161 LN, 161/216, 204/159.16, 204/159.17, 204/159.21, 260/30.2, 260/31.8 R, 260/32.6 N, 260/33.6 UA, 260/33.8 UA, 260/41 R, 260/47 UA, 260/47 XA, 260/47 CZ
[51] Int. Cl.......................... C08g 5/18, C08g 20/28
[58] Field of Search... 260/78 UA, 47 UA, 47 CZ, 260/326.5 FM, 47 XA, 72 R, 51.5, 52

[56] References Cited

UNITED STATES PATENTS

| | | | |
|---|---|---|---|
| 2,526,517 | 10/1950 | Tawney | 260/326.5 FM |
| 2,593,840 | 4/1952 | Buc | 260/326 R |
| 2,743,260 | 4/1956 | Tawney | 260/78 UA |

*Primary Examiner*—Harold D. Anderson
*Attorney, Agent, or Firm*—Richard R. Brainard; Paul A. Frank et al.

[57] ABSTRACT

A method is provided for introducing aliphatically unsaturated imidomethyl radicals into a variety of aromatic organic compounds and aromatic organic materials derived therefrom. Imidomethylation is achieved with a mixture of formaldehyde, and an aliphatically unsaturated imide such as maleimide. The resulting imidomethyl substituted aromatic organic materials can be used as molding and laminating compounds.

23 Claims, No Drawings

ALIPHATICALLY UNSATURATED IMIDES AND METHOD FOR MAKING SAME

The present invention relates to methods for introducing imidomethyl substitution into a variety of aromatic organic compounds, to the production of thermoplastic solventless resins convertible to the infusible state, and to the products produced thereby.

Prior to the present invention, various methods were known for introducing imidoalkyl radicals into aromatic organic compounds. Substitution of the aromatic ring is generally achieved with a Friedal Crafts catalyst in combination with an imidoalkylating agent. One technique uses a preformed imidomethylol compound as the alkylating agent in combination with a Freidal Crafts catalyst. For example, Buc U.S. Pat. No. 2,593,840 teaches that N-phthalimidomethyl derivatives of aromatic compounds can be made by use of N-methyl-olphthalimide and sulfuric acid. Although the "preform" method requires the synthesis and isolation of an imidoalkylating agent prior to its use with the Friedel Crafts catalyst, the preformed imidoalkylation agent can be advantageously used to introduce saturated, as well as aliphatically unsaturated imidoalkyl radicals into various aromatic organic materials.

Another method which has been used to imidoalkylate aromatic organic materials involves the heating of a mixture of an aromatic organic compound, with formaldehyde, organic imide and sulfuric acid. This procedure generates an imidomethylol reagent insitu. The insitu method has both advantages and disadvantages over the preformed method. One of the advantages of the insitu method is that the sulfuric can serve as both Friedel Crafts catalyst and solvent. Another advantage is that the imidoalkylating agent does not have to be isolated from the mixture. A disadvantage is that reaction can occur between the aromatic organic compound and the formaldehyde in preference to the desired imidoalkylation of the ring. This undesirable result which can lead to tarry by-products, can be minimized by deactivating the ring by nitro substitution. Another disadvantage which is taught, for example, by P. O. Tawney, J. Org. Chem. 26,16, (1961), is that the unsaturated imide, such as maleimide, is preferably utilized under basic reaction conditions with formaldehyde, such as a PH greater than 3.

The present invention is based on the discovery that a wide variety of aromatic organic compounds free of deactivating groups can be imidomethylated by the above described in-situ method without any undesirable side reactions occuring between the formaldehyde and the aromatic ring. Surprisingly the method of the present invention even allows the use of molar excesses of formaldehyde over the moles of the aliphatically unsaturated imide in the imidoalkylation mixture without undesirable crosslinking resulting from the generation of methylene radicals and the formation of methylene bridges between aromatic rings. More specifically, contact between formaldehyde and the aliphatically unsaturated imide is effected initially in the absence of the aromatic organic compound to be imidoalkylated. In instances where formaldehyde is employed at molar excesses over the aliphatically unsaturated imide, control of methylene crosslinking is achieved by using critical amounts of water in the imidoalkylation mixture.

There is provided by the present invention, thermoplastic solventless aromatic resins curable to the infusible state, which can consist of a plurality of aromatic rings joined by methylene bridges and substituted with aliphatically unsaturated imidomethyl groups attached to a carbon atom of an aromatic carbocylclic ring of the formula, (1)
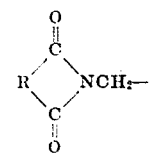

where R is an aliphatically unsaturated divalent radical selected from

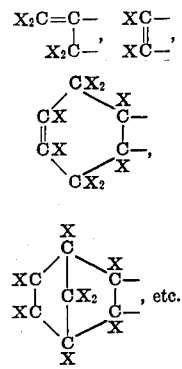

where X is selected from hydrogen, chloro, lower alkyl such as methyl, ethyl, propyl, butyl, and mixtures of such radicals.

The method of the present invention comprises a. effecting reaction at a temperature in the range of from 0° to 100°C between an aliphatically unsaturated imide of the formula, (2)
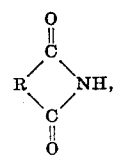

and at least 1 mole of formaldehyde, per mole of such aliphatically unsaturated imide, in the presence of by weight, from 0.1 to 10 parts of sulfuric acid, per part of mixture, and up to 1 part of water, per part of sulfuric acid, b. effecting reaction between the resulting mixture of (a) and from 0.5 to 5 moles of aromatic organic compound at a temperature in the range of from 0° to 150°C.

c. separating from the resulting mixture of (b), a thermoplastic imidomethyl substituted aromatic organic material flowable at a temperature below 200°C, and convertible to the infusible state at temperatures in the range of between 100° to 200°C, where the aromatic compound of (b) is a member selected from i. aromatic hydrocarbons having from 6 to 18 carbon atoms.

ii. diaryl compounds of the formula,

R″ Y R″ where R is as previously defined, Y is selected from the class consisting of —O—,

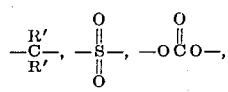

etc. R′ is selected from hydrogen and lower alkyl radicals, such as methyl, ethyl, propyl, etc., and R″ is a monovalent aryl radical derived from the aromatic hydrocarbons of (i), and iii. compounds selected from (i) and (ii) substituted with up to four radicals per aromatic ring selected from the class consisting of hydroxy, halogen, carboxy, lower alkyl radicals, alkoxy radicals, maleimido radicals, and mixtures thereof.

The thermoplastic solventless resins provided by the present invention can be more fully defined as imidomethyl substituted aromatic organic materials, flowable at temperatures below 200°C, and convertible to the infusible state at temperatures between 100° to 200°C, consisting of (1) repeating units of the formula -Ar-CH$_2$- wherein Ar is a divalent aromatic carbocyclic radical and (2) imidomethyl radicals of the formula (1)

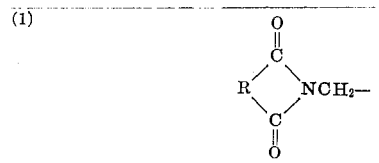

attached to aromatic carbocyclic ring carbon atoms of (1), the ratios of said imidomethyl radical per aromatic carbo-cyclic nucleus having a value of 0.2 to 2, inclusive, where the aromatic carbocyclic nuclei of said organic resin are selected from the class consisting of i. aromatic hydrocarbons having from 6–18 carbon atoms,
ii. diaryl compounds of the formula,

R″YR″ , where Y is selected from the class consisting of —O—,

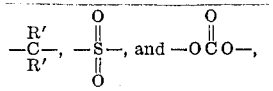

R is a divalent aliphatically unsaturated hydrocarbon radical, R′ is selected from hydrogen and lower alkyl radicals, and R″ is a monovalent aryl radical derived from the aromatic hydrocarbons of (i), and iii. compounds selected from (i) and (ii) substituted with up to four radicals selected from the class consisting of halogen, carboxy, lower alkyl radicals, alkoxy radicals, and mixtures thereof.

Included by the aromatic organic compounds which can be imidomethylated in accordance with the practice of the present invention, are aromatic hydrocarbons, such as benzene, biphenyl, napthalene and anthracene; alkyl substituted and organo functional substituted derivatives of such aromatic organic hydrocarbons including toluene, xylene, durene, ethylbenzene, dimethylnaphthalene, benzoic acid, toluic acid, terephthalic acid, 4,4′-dihydroxybiphenyl, phenylmaleimide, etc. In addition, halogen substituted aromatic compounds, such as chlorobenzene, bromonaphthalene, chlorinated biphenyl, etc. Diphenyl compounds, such as diphenyl ether, diphenyl sulfone, diphenyl carbonate, diphenyl methane, and 2,2-diphenyl propane.

Unsaturated imides which can be employed in combination with the above described aromatic organic compounds include, maleimide, Δ$^4$— tetrahydrophthalimide, 3,6-endomethylene —Δ$^4$ — tetrahydrophthalimide, hexachloro - Δ$^4$ - tetrahydrophthalimide, etc. The imidomethylene substituted aromatic organic materials which are included in the scope of the present invention can have a molecular weight in the range of from 296 to 5,000. Some of these thermoplastic solventless resins are compounds such as bis(maleimidomethyl) benzene, bis(maleimidomethyl) toluene, bis(maleimidomethyl) chlorobenzene, bis(maleimidomethyl) diphenylcarbonate, maleimidomethyl-substituted diphenyl ether, etc.

In addition, thermoplastic prepolymers having the average formulas, also are included, such as

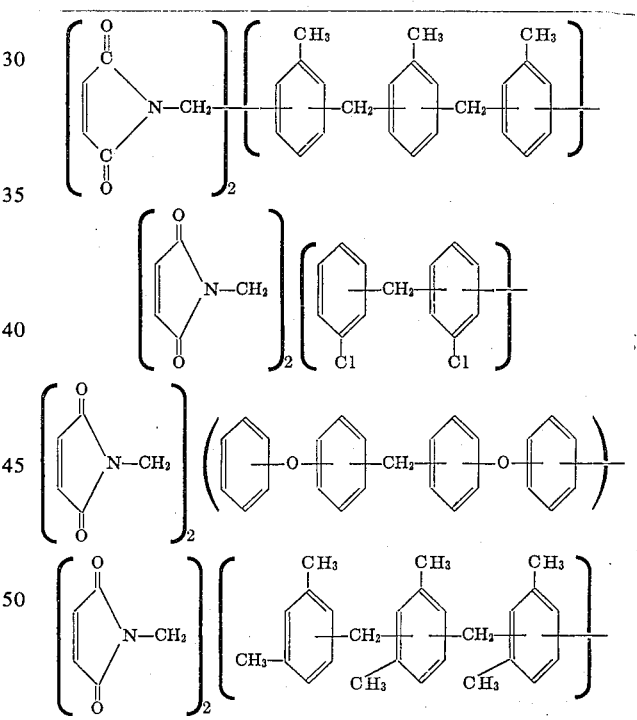

In the practice of the invention, an imidomethylation mixture is initially made by effecting reaction between formaldehyde, which for purposes of the present invention can be used in the form of trioxane, hexamethylenetetramine, paraformaldehyde, and aliphatically unsaturated imide in the presence of sulfuric acid. The aromatic organic compound is then added to the mixture.

Experience has shown that effective results can be achieved if the aliphatically unsaturated imide is contacted with the formaldehyde in the presence of sulfuric acid at temperatures between 20° to 100°C.

Depending upon the nature of the imidomethyl substituted thermoplastic aromatic organic material desired, which hereinafter can be referred to as the "imido resin" the proportions of formaldehyde and aliphatically unsaturated imide in the imido-alkylation mixture can vary. For example, if imido resin is desired having an average of from about 1 to 3 chemically combined polyvalent aromatic organic radicals, substantially equal molar amounts of aliphatically unsaturated imide and formaldehyde can be employed, and more specifically from about 0.8 to 1.2 moles of formaldehyde, per mole of aliphatically unsaturated imide. In instances where it is desired to have imido resin having an average of about 10 chemically combined polyvalent aromatic organic radicals, a proportion of about 10 or more moles of formaldehyde, per mole of aliphatically unsaturated imide can be employed. In instances where the proportions of formaldehyde substantially exceeds the amount of aliphatically unsaturation in the mixture, it has been found desirable to utilize water in an amount of up to 100 percent by weight, based on the weight of sulfuric acid, which for purposes of calculation can be based on 98 percent of $H_2SO_4$ by weight. Otherwise, substantially anhydrous conditions can be utilized, such as where the amounts of formaldehyde and aliphatically unsaturated imide employed in the imidomethylation mixture are substantially equal.

The sulfuric acid can be utilized in the imidomethylation mixture over a wide range by weight, as it can be employed as both a Friedel Crafts catalyst and a solvent for the reactants. Although the amount of sulfuric acid utilized is not critical, it has been found that a weight proportion of from 0.5 to 5 parts of sulfuric acid, per part of imidomethylation mixture will provide for effective results. The sulfuric acid can also be employed as a Friedel Crafts catalyst under such circumstances in combination with up to major amounts of other strong acids such as phosphoric or trifluorocetic acid.

The addition of the aromatic organic compound to the imidomethylation mixture can be effected at a temperature of from 0° to 150°C, and preferably from 20° to 100°C. In instances where imido resin is desired having an average of about 1 to 3 chemically combined polyvalent aromatic organic radicals, a proportion of aromatic organic compound can be employed in the imidomethylation mixture to provide an average of about two imidomethyl radicals, per mole of aromatic organic compound.

In instances where imidomethylation mixture is employed having an excess of formaldehyde over aliphatically unsaturated imides, to provide for the production of imido resin having an average of more than about 1 to 3 aromatic nuclei joined by methylene bridges, for example, up to an average of about 10 chemically combined polyvalent aromatic organic radicals, the aromatic organic compound and the formaldehyde are preferably employed in substantially equal molar amounts. Experience has shown, for example, that if the moles of formaldehyde substantially exceeds the total moles of aliphatically unsaturated imide and aromatic organic compound, that excessive crosslinking can occur which can render the imido resin useless as a molding material, unless moderating amounts of water are employed.

After the addition of the aromatic organic compound, to the imidoalkylation mixture, reaction can be effected at temperatures between 0° to 150°C, and preferably between 20° to 100°C, while the mixture is agitated. Reaction times can vary between 1 hour or less to 20 hours or more. Recovering of the imido resin can be achieved by conventional means such as by crystallization, solvent extraction, stripping, etc. For example, water can be added to the reaction mixture, and the product can be extracted with an organic solvent such as methylene chloride or benzene; the organic solvent can be stripped, etc.

The imidomethyl substituted aromatic organic material which can be made by the present invention can be employed in a variety of applications depending upon such factors as the nature of the aromatic organic compound employed, the degree of imidiomethylene substitution on the ring structure, and the nature of functional groups on the aromatic material. These imido resins for example, can be employed as molding compounds, varnishes, adhesives, laminating compounds; they can be used to make solvent resistant coatings, dielectrics, insulating coatings, components for thermosetting mixtures, and several other applications normally requiring free radical and high energy electron curable materials.

The imidomethyl substituted aromatic organic materials of the present invention can be blended with various aliphatically unsaturated organic materials, such as aliphatically unsaturated organic monomers and certain aliphatically unsaturated organic polymers as well as organic polymers free of aliphatic unsaturation.

Blends of the imido-methyl substituted aromatic organic material and the aforementioned organic monomers or polymers can be made over a wide proportion by weight. Experience has shown that there should be employed at least about 5 percent and up to 95 percent by weight, of the imido-methyl substituted aromatic organic material to provide for cured products having improved characteristics. For example, the blend of the imidomethyl substituted aromatic organic material and the aforementioned organic materials can be employed in making laminating compounds solventless varnishes, molding compounds, coating compositions, etc., depending upon the proportions of the imidomethyl substituted aromatic organic material and the organic polymer or monomer utilized in the blend.

Included by the aliphatically unsaturated monomers which can be employed in combination with the imidomethyl substituted aromatic organic material of the present invention are, for example, styrene, bismaleimide, N-phenylmaleimide, vinylchloride, isobutylene, butadiene, isoprene, chlorotrifluoroethylene, 2-methylpentene-1; vinyl esters of organic carboxylic acids such as vinylformate, vinylacetate, acrylonitrile, vinylmethyl, methyl, butyl, etc. esters of acrylic and methacrylic acids, etc.; divinylbenzene, triallyl-cyanurate, triallyltrimellitate, and N-vinylphthalimide, N-allyphthalimide, N-allyltetrachlorophthalimide, vinylsiloxanes, etc. Among the organic polymers that can be employed in combination with the imidomethyl substituted aromatic organic materials of the present invention are, for example, polyvinylchloride, polyethylene, polypropylene, polysulfone, polystyrene, polyurethane, organopolysiloxanes, polyesters, polyphenylene oxides, epoxide resins, polycarbonates, etc.

Cure of the imidomethyl substituted aromatic organic material, or blend thereof with any of the aforementioned organic monomers or polymers, or combination thereof, can be effected with conventional free radical initiators at temperatures of from 50° to 300°C, while 100° to 200°C has sometimes been found to be more desirable. Acceleration of the cure of the imidomethyl substituted aromatic organic material or blend thereof, can be achieved with organic peroxides, such as dicumyl peroxide, benzoyl peroxide, tertiary butylperbenzoate, tertiary alkylperoxycarbonate, etc. The peroxides can be employed from about 0.1 percent to about 5 percent by weight, based on the total weight of the blend. In addition, high temperature free radical sources can also be employed, such as the commercially available azodicarbonamides 2,5-dimethyl 2,5-bis(tertbutylperoxyhexane), etc. In addition, the imidomethyl substituted aromatic organic materials or blends thereof, in addition to being curable by the aforementioned free radical initiators, can be cured with heat or radiation with high energy electrons, x-rays, ultraviolet lighting, etc.

In addition to the aforementioned aliphatically unsaturated monomers and organic polymers which can be blended with the imidomethyl substituted aromatic organic material of the present invention, there can be employed, by weight, fillers in proportions of from 0 to 200 parts of filler, per 100 parts of the imidomethyl substituted aromatic organic material. Included among the fillers which can be employed are, for example, clay, ground quartz, silica, sand, carbon black, glass fibers, glass beads, carbon fiber, asbestos, etc. In addition, other ingredients such as solvents at from 60 percent to 90 percent by weight of the resulting curable composition also can be employed such as N-methyl pyrrolidone, dimethylacetamide, toluene, methylenechloride, as well as plasticizers such as trioctylphthalate, etc.

In order that those skilled in the art will be better able to practice the invention, the following examples are given by way of illustration and not by way of limitation. Stirring the reactants occurred during the addition of the Friedel Crafts catalyst. All parts are by weight.

EXAMPLE 1

There was added 3.3 parts of p-formaldehyde to 10 parts of 96 percent sulfuric acid. The mixture was stirred at room temperature until all solid was dissolved whereupon 9.7 parts of maleimide was added. The mixture became warm upon stirring and a clear viscous amber colored solution was formed within a few minutes. To this solution, there was added 3.9 parts of anhydrous benzene. The mixture was then stirred for up to 15 hours at a temperature of about 60°C. After about 3 hours, a crystalline product was formed. The mixture was stirred for an additional 2 hours without external cooling. A white semi-solid was formed which was recovered by pouring the mixture into water and filtering it. There was obtained 13 parts of colorless solid consisting principally of 1,4-bis(maleimidomethyl)benzene, or 90 percent yield of product based on starting reactants. The product was further recyrstalized from acetonitrile. There was obtained 1,4-bis(maleimidomethyl) benzene as shown by its NMR spectrum. Its identity was further confirmed by elemental weight percent analysis for $C_{16}H_{12}N_2O_4$ CALC:C 64.9; H 4.1; N 9.4; FOUND:C 65.0; H 4.25; N 10.3; Molecular weight by mass spectral analysis was found to be 296.

A mixture was made of 3 mole equivalents of 1,4-bis(maleimidomethyl) benzene and 2 mole equivalents of methylene dianiline. The mixture was found to be useful as a molding compound for making automotive parts. The mixture was heated at 150°C and a homogeneous melt was obtained. The melt cured to a hard, insoluble resin upon heating at 200°C for 15 minutes.

EXAMPLE 2

There was added 4.6 parts of anhydrous toluene to a mixture of 3.3 parts of p-formaldehyde, 9.7 parts of maleimide and 10 parts of 96 percent sulfuric acid. The mixture was stirred at room temperature for 3 to 8 hours. There was then added to the mixture about 20 parts of water and 50 parts of methylene chloride. The organic layer was separated, washed with sodium bicarbonate solution and then dried with magnesium sulfate. The solvent was then evaporated. There was obtained 13.3 parts of an amber colored viscous fluid. Based on method of preparation and its NMR specturm, the product WAS bis (maleimidomethyl) toluene. Its identity was confirmed by elemental weight percent analysis for $C_{17}H_{14}N_2O_4$ CALC: C 65.8; H 4.55; N 9.03 FOUND C 65.8; H 4.61; N 9.13.

A copper plate was coated with a blend of the bis (maleimidomethyl) toluene containing 1 percent by weight of benzoylperoxide; the plate was heated at 100°C for about 30 minutes. There was obtained an adherent, hard organic solvent resistant coating.

EXAMPLE 3

There was added 5.6 parts of chlorobenzene to a mixture of 3.3 parts of p-formaldehyde, 9.7 parts of maleimide and 10 parts of 96 percent sulfuric acid. The mixture was stirred for two hours at 100°C. In accordance with the procedure of Example 1, there was obtained a 83 percent yield of a nearly colorless viscous fluid containing a mixture of maleimidomethyl chlorobenzene and bis(maleimidomethyl) chlorobenzene. Its identity was confirmed by its elemental weight analysis. FOUND: C 55.0; H 3.36; N 7.69; Cl 14.6. Its mass spectrum showed a molecular weight of 330, corresponding to bis(maleimidomethyl) chlorobenzene.

A glass substrate was coated with a mixture of bis(-maleimidomethyl) chlorobenzene and 2 percent by weight of benzophenone. The mixture was exposed to U. V. radiation employing a H3T7 mercury lamp. By varying the distance of the lamp from the glass substrate, a hard organic solvent resistant coating was obtained after exposure times of 30 seconds to 5 minutes.

EXAMPLE 4

There was added 1.0 parts of diphenylcarbonate to a mixture at room temperature consisting of 0.3 parts of p-formaldehyde, 1.0 parts of maleimide and 1 part of 96 percent sulfuric acid. A mixture was stirred for 2 hours at room temperature. After dilution with water and extraction with chloroform, there was obtained 2 parts of a product in the form of a yellow viscous fluid. Nuclear magnetic resonance showed the presence of two maleimidomethyl groups on the aromatic rings of the resulting aromatic organic carbonate. Based on method of preparation and its NMR spectrum, the product was a diphenylcarbonate having an average of two maleimidomethyl groups.

The above bis(maleimidomethyl)diphenylcarbonate was blended with 1 percent by weight of dicumyl peroxide. The mixture was applied to an aluminum substrate and heated for 30 minutes at 120°C. There was obtained a hard organic solvent resistant film.

EXAMPLE 5

There was added 8.5 parts of diphenyl ether to a mixture at room temperature consisting of 3.3 parts of p-formaldehyde, 9.7 parts of maleimide and 10 parts of sulfuric acid. The mixture was stirred for 2 hours at room temperature. There was obtained 16 parts of a light amber thermoplastic resin by addition of water to the reaction mixture, and extraction with chloroform. Based on method of preparation, mass spectrum analysis showing a molecular weight of 388, and its elemental analysis showing 7.2 percent nitrogen by weight, the product was bis (maleimidomethyl)phenoxybenzene.

The bis(maleimidomethyl)phenoxybenzene was heated on a hot plate, and started to flow at about 70°C. It cured to an organic solvent resistant hard insoluble resin after 1 hour at 160°C without the use of a free radical initiator.

EXAMPLE 6

To a solution of 19.4 parts of maleimide, and 6.5 parts of paraformaldehyde in 40 parts of 96 percent sulfuric acid, was added 19.8 parts of o-hydroxybenzophenone. The mixture was agitated with intermittent cooling in an ice bath so that the temperature would not rise above about 50°C. After the initial exothermic reaction had subsided, the homogeneous mixture was kept at 40°C for another two hours and the product was then isolated by addition of water and extraction with chloroform. A colorless solid was obtained at a yield of 79 percent, having a melting point 187°–188°C. Based on its NMR spectrum and elemental analysis the product was bis(maleimidomethyl)-benzoyl phenol. CALC: $C_{22}H_{15}N_2O_6$ (WT%): C 66.5; H 3.6; N 6.7; FOUND: C 66.7; H 3.9; N 6.6

There is added 1 percent by weight of benzoylperoxide to the blend of equal moles of the bis(maleimidomethyl)benzoylphenol and styrene. The mixture is employed as a molding compound to make an automotive part exhibiting U. V. stability and resistance to organic solvents.

EXAMPLE 7

There was added 10 parts of N-phenyl maleimide to a solution of 5.6 parts of maleimide and 1.73 parts of paraformaldehyde in 33 parts of 96% sulfuric acid. The mixture was stirred at room temperature for about 4 hours. The product was isolated by addition of water and extraction with chloroform. A yield of 14 parts of product corres-ponding to 83 percent of the theory was obtained. Based on method of preparation, the product was maleimidomethylphenyl maleimide. Its identity was confirmed by its weight percent elemental analysis: CALC: C 63.83; H 3.55; N 9.93; FOUND : $C_{63.7}$; H 3.58; N 9.89.

Equal parts of the maleimidomethylphenyl maleimide and meta-phenylenediamine are heated with 1 percent by weight of benzoylperoxide. The mixture is found to flow at about 110°C, and suitable for a molding compound. There is obtained an organic solvent resistant thermoset resin.

Example 8

There was added 7.2 parts of toluic acid to a mixture containing 10 parts of maleimide, 3.1 parts of paraformaldehyde, and 15 parts of 96 percent sulfuric acid. After agitating the mixture at room temperature for 15 hours and work-up as described in Example 1, there was obtained a colorless solid. Based on method of preparation, and its NMR spectrum, the solid was bis(-maleimido)toluic acid. Its identity was conformed by its wt. percent elemental analysis: C 59.0; H 3.8; N 6.9:

The above resin is blended with 1 percent by weight of benzoylperoxide. It is cured at 110°C to thermoset. The product is then pulverized and is found to exhibit valuable ion exchange properties.

EXAMPLE 9

There was added 6.7 parts of durene to a mixture of 10 parts of maleimide and 1.7 parts of trioxane dissolved in 33 parts of 96 percent sulfuric acid. The mixture was stirred at room temperature for 2 hours and then worked up by adding water and washing the product with acetone. There was obtained a white solid which showed a ratio of 4 methylene protons and 4 methinyl protons for every 12 methyl protons in the NMR spectrum. Based on method of preparation and NMR spectrum, the product was bis(maleimidomethyl)durene.

A 3:2 molar blend of the above diunsaturated imido durene and methylene dianiline is heated to 150°C. The bisimide flows. The mixture converts to an organic solvent resistant resin when molded at a 100 psi, at temperatures up to 250°C.

EXAMPLE 10

A mixture of 9.7 parts of maleimide and 6.6 parts of paraformaldehyde was dissolved in 12.5 parts of 97 percent sulfuric acid and 4.8 parts of water. The solution was agitated until a thick white precipitate was formed after about 30 minutes. The mixture was allowed to stand for 4 hours. A white crystalline solid was recovered by filtration. The product was washed with water and recrystallized from acetonitrile. Based on method of preparation, the product which had a melting point of 118°C, was bis(maleimidomethoxy)methane. Its identity was further confirmed by its elemental analysis and NMR spectrum. The NMR spectrum showed single peaks for the vinyl protons, the imidomethylene groups and the central methylene group, flanked by two oxygen atoms in a ratio 2:2:1, respectively. Elemental weight percent analysis: THEOR: C 49.6; H, 3.8; N 10.3; FOUND: C 49.1%; H 3.7%; N 10.3%. Its molecular weight was 249±12, which was in agreement with its theoretical value of 266.

A 10 percent solution in toluene was prepared with equal moles of the above resin and m-phenylene diamine. The solution was employed to treat an aluminum substrate which formed an organic solvent resistant coating upon heating to a temperature of 150°C.

EXAMPLE 11

A mixture of 97 parts of maleimide, and 60 parts of paraformaldehyde was dissolved in 175 parts of 97.8 percent sulfuric acid, and 32.5 parts of water was added. The mixture was allowed to cool to 45°C. There was added to the mixture 138 parts of toluene, and the mixture stirred. The temperature of the mixture was maintained at 50°C during addition. After 2 hours, 15 parts of paraformaldehyde was added and stirring of the mixture continued at 50°C for an additional period of 4 hours. A white viscous emulsion formed during the reaction. It was broken by addition of approximately 250 parts of water and about 375 parts of chloroform. The organic layer was separated, washed with dilute sodium bicarbonate solution and water, and dried. The solvent was evaporated and a yellow viscous fluid was extracted with three 33 part portions of hot hexane. After removal of residual solvent in vacuo at 50°C, there was obtained 186 parts of product. The product converted to a thermoplastic solid when allowed to cool to room temperature. The NMR spectrum of the product showed an average of 3 toluene rings, two maleimidomethyl groups and two methylene bridges between rings. Elemental analysis (weight percent) showed: C 73.4; H 5.8; N 4.7; and a molecular weight of 500±5 percent.

Based on method of preparation and analytical data, the product was composed of two maleimido methyl radicals and three tolylene groups, interconnected by methylene radicals.

The thermoplastic resin is heated to 50°C to form a yellow viscous fluid. The fluid is poured into a mold and heated for 30 minutes at 180°C at 500 psi. A rigid thermoset part is removed from the mold showing superior resistance to toluene when immersed at 50°C for 7 days.

EXAMPLE 12

There was added 13.8 parts of toluene to a solution of 9.7 parts of maleimide, 6 parts of paraformaldehyde, 17.5 parts of 98 percent sulfuric acid, and 3.5 parts of water. The mixture was maintained at a temperature of 50°C for 3 hours. The same procedure was repeated, except the second mixture was maintained at a temperature of 75°C. A third mixture was made following the same procedure, and maintained at a temperature of 100°C for 3 hours.

The above three mixtures were then processed in accordance with the procedure of Example 11. An average yield of 80 percent of product was obtained. Based on method of preparation, the product was a maleimidomethyl substituted toluene. Based on gel permeation chromatography, the first two mixtures yielded products having molecular weights in the range of from 500–840. The molecular weight of the third product was 1,300–2,700. The products had an average of from 3 to 10 tolyl groups, from 2 to 10 maleimidomethyl radicals, and from 2 to 9 methylene groups per molecule. The flow temperatures of resins range from 90°C to 100°C. The products utilized were useful as thermosetting coating materials and for making molding compounds.

EXAMPLE 13

There was added 11.7 parts of benzene to a solution of 9.7 parts of maleimide and 6 parts of paraformaldehyde, and 17.5 parts of 98 percent sulfuric acid, and 3.5 parts of water. The resulting mixture was allowed to react for 6 hours at a temperature of 70°–75°C, with stirring. There was isolated 14 parts of low melting yellow product. Based on its infrared spectrum, and its NMR spectrum, the product was a maleimido methyl substituted resin having an average of 2 maleimido methyl groups, per 3 benzene rings interconnected with methylene radicals. The composition of the product was confirmed by its weight percent elemental analysis: C 78.0; H 5.7; N 5.9.

An aluminum substrate was warmed and treated with the above resin. It was then heated for 1 hour at 160°C. There was obtained a tough adherent organic solvent resistant coating exhibiting valuable insulating properties.

EXAMPLE 14

There was added with stirring, 3.4 parts of diphenylether to a mixture of 1.94 parts of maleimide, 0.91 parts of paraformaldehyde dissolved in 5 parts of 96 percent sulfuric acid, and 1.1 parts of water. A homogeneous paste formed within 3 hours when the mixture was stirred. The mixture was then heated to 50°C and stirring was continued for 3 additional hours. There was recovered in accordance with the procedure of Example 11, 5 parts of a yellow thermoplastic solid having a flow temperature of approximately 75°C. Based on its method of preparation and its infrared spectrum, the product was a maleimido methyl substituted aromatic organic material having 2 maleimido methyl radicals, and 2 diphenyl ether groups linked by a methylene radical. The composition of the product was confirmed by its elemental analysis: C 72.4; H 4.8; N 4.4. The average molecular weight of the product was found to be 622±30.

The above product was warmed until it was a free flowing fluid and there was incorporated into it 1 percent of benzophenone. The fluid mixture was then irradiated with ultraviolet light. A hard organic solvent resistant film was obtained.

EXAMPLE 15

There was added at room temperature, 25.5 parts of diphenyl ether to a mixture of 9.7 parts of maleimide, and 6 parts of paraformaldehyde dissolved in 32.6 parts of 98 percent sulfuric acid, and 8 parts of water. The mixture was stirred at room temperature for 3 hours. The mixture was then heated to 50°C and then stirred for an additional 3 hours. There was obtained a cream colored emulsion which was treated with chloroform and water as described in Example 11. After hexane extraction, there was obtained 17 parts of a light tan glassy product having a flow temperature of about 70°C. Based on method of preparation and its infrared spectrum, the product was a maleimido methyl substituted aromatic organic material having 2 maleimido methyl radicals, and 3 diphenyl ether groups linked by methylene radicals.

Several parts of the above resin were placed on a glass plate. The plate was warmed above the resin flow temperature to produce an even resin layer on the glass. A second glass plate was placed upon the treated glass substrate and the remaining composite was heated at 160°C for 1 hour. There was obtained a glass resin composite having a permanent bond between the glass plates.

EXAMPLE 16

There was added 19.6 parts of ditolyl methane to a mixture of 9.7 parts of maleimide, 4.5 parts of paraformaldehyde, and 40 parts of 87 percent sulfuric acid. The mixture was stirred for 5 hours at a temperature of 55°C. There was obtained 22 parts of a yellow low melting glass from the mixture, in accordance with the above described procedure. Based on its method of preparation and its NMR spectrum, the product was an aromatic organic material having 2 maleimido methyl groups and 4 tolyl radicals interconnected by methylene bridges.

A steel plate composite consisting of two steel plates in contact with several parts of the above resin, was heated to 100°C under 50 psi pressure. The composite was further cured by heating at 180°C for 30 minutes. There was obtained a steel composite having a strong permanent bond between the steel plates.

EXAMPLE 17

A mixture of 4.85 parts of maleimide and 2.25 parts of paraformaldehyde was dissolved in 8 parts of 98 percent sulfuric acid containing 3.5 parts of water. The mixture was combined with 4.7 parts of phenol and agitated at 25°C for 1 hour, and subsequently at 50°C for 2.5 hours. The solid reaction product was washed with water, dissolved in acetone, neutralized in sodium bicarbonate and recovered by evaporation of the solvent. A yellow resin was obtained having a flow temperature of about 75°C. Based on its infrared and NMR spectra, as well as its method of preparation, the product was a maleimido substituted aromatic organic material having an average of two maleimidomethyl groups and two phenol radicals linked by a methylene radical.

Several parts of the above resin were heated on a hot plate for 1 hour at 160°C. There was obtained an organic solvent resistant film having valuable insulating properties.

EXAMPLE 18

There was added 14.4 parts of bis(dichlorophenyl) methane to a solution of 12.0 parts of maleimide and 3.6 parts of paraformaldehyde in 30 parts of 98 percent sulfuric acid. The mixture was agitated at a temperature of 50°C for 3 hours which resulted in the formation of a viscous emulsion. A product was recovered by addition of 100 parts of water and extraction with chloroform. The chloroform solution was washed with water, dried and the solvent evaporated. There was obtained 25 parts of a light tan colored resin which had a flow temperature of about 80°C. There was found by elemental weight percent analysis: C 58.0; H 3.4; N 7.9; Cl 11.9. Based on method of preparation, elemental analysis and an average molecular weight of about 494, the product was a maleimidomethyl substituted aromatic organic material, having an average of 3.4 maleimidomethyl radicals, per dichlorodiphenyl methane radical.

A molding compound was made by blending several parts of the above resin with 1% by weight of azo-diisobutyronitrile. The blend was converted to a hard organic solvent resistant material by heating at 100°C for 30 minutes.

Although the above examples are limited to only a few of the very many variables which can be employed to illustrate the present invention, it should be understood that the present invention is directed to a much broader class of solventless resin and method for making them, which can include imidoemethyl radicals of formula (1), and materials and conditions as set forth in the description preceding these examples.

We claim:

1. Imidomethyl substituted aromatic carbocyclic organic resin convertible to the infusible state at temperatures between 100°C and 200°C, consisting of (1) repeating units of the formula

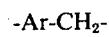

wherein Ar is a divalent aromatic carbocyclic radical and (2) imidomethyl radicals of the formula (1)
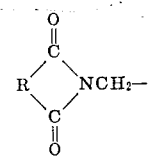

attached to aromatic carbocyclic ring carbon atoms of (1), the ratios of said imidomethyl radical per aromatic carbocyclic nucleus having a value of 0.2 to 2, inclusive, where the aromatic carbocyclic nuclei of said organic resin are selected from the class consisting of
  i. aromatic hydrocarbons having from 6-18 carbon atoms,
  ii. diaryl compounds of the formula,

where Y is selected from the class consisting of -O-,

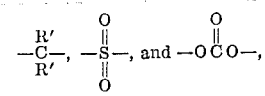

R is a divalent aliphatically unsaturated hydrocarbon radical, R' is selected from hydrogen and lower alkyl radicals, and R'' is a monovalent aryl radical derived from the aromatic hydrocarbons of (i), and iii. compounds selected from (i) and (ii) substituted with up to four radicals selected from the class consisting of halogen, carboxy, lower alkyl radicals, alkoxy radicals, and mixtures thereof.

2. An aromatic organic material as in claim 1, where the aliphatically unsaturated imidomethyl radical is a maleimidomethyl radical.

3. An imidomethyl substituted organic material as in claim 1, where the aromatic organic compound is benzene.

4. An imidomethyl substituted organic material as in claim 1, where the aromatic organic compound is toluene.

5. An imidomethyl substituted organic material as in claim 1, where the aromatic organic compound is diphenylether.

6. An imidomethyl substituted organic material as in claim 1, where the aromatic organic compound is chlorobenzene.

7. An imidomethyl substituted organic material as in claim 1, where the aromatic organic compound is diphenylcarbonate.

8. An imidomethyl substituted organic material as in claim 1, where the aromatic organic material is o-hydroxybenzophenone.

9. An imidomethyl substituted organic material as in claim 1, where the aromatic organic compound is N-phenylmaleimide.

10. An imidomethyl substituted organic material as in claim 1, where the aromatic organic compound is toluic acid.

11. An imidomethyl substituted organic material as in claim 1, where the aromatic organic compound is durene.

12. An imidomethyl substituted organic material as in claim 1, where the aromatic organic compound is bis(chlorophenyl)methane.

13. An imidomethyl substituted organic material as in claim 1, where the aromatic organic compound is ditolylmethane.

14. A maleimidomethyl substituted methoxymethane having at least two chemically combined maleimidomethyl radicals.

15. A maleimidomethyl substituted phenol convertible to the infusible state at temperatures between 100°C. to 200°C. having an average of from about 2 to about 10, inclusive, chemically combined phenol radicals bonded together through phenol ring carbon atoms by 1-9, inclusive, methylene radicals, where said maleimidomethyl substituted phenol has an average of from 0.2 to 2, inclusive, maleimidomethyl radicals per phenol nucleus and joined to an aromatic carbocyclic ring carbon atom thereto.

16. 1,4-Bis(maleimidomethyl)benzene
17. Bis(maleimidomethyl)toluene
18. Bis(maleimidomethyl)chlorobenzene
19. Bis(maleimidomethyl)phenoxybenzene
20. Bis(maleimidomethyl)benzoylphenol
21. Maleimidomethyl phenylmaleimide
22. Bis(maleimidomethyl)toluic acid
23. Bis(maleimidomethyl)durene.

* * * * *